US012065035B2

United States Patent
Shin (10) Patent No.: US 12,065,035 B2
(45) Date of Patent: Aug. 20, 2024

(54) IN-WHEEL DRIVE DEVICE AND VEHICLE INCLUDING THE SAME

(71) Applicant: HYUNDAI MOBIS CO., LTD., Seoul (KR)

(72) Inventor: Kyeong Ho Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 533 days.

(21) Appl. No.: 17/384,906

(22) Filed: Jul. 26, 2021

(65) Prior Publication Data

US 2022/0024304 A1    Jan. 27, 2022

(30) Foreign Application Priority Data

Jul. 27, 2020   (KR) .......................... 10-2020-0093326

(51) Int. Cl.
| | | |
|---|---|---|
| *F16H 57/08* | (2006.01) | |
| *B60B 27/00* | (2006.01) | |
| *B60K 7/00* | (2006.01) | |
| *B60K 17/04* | (2006.01) | |
| *F16H 57/023* | (2012.01) | |
| *F16H 55/17* | (2006.01) | |

(52) U.S. Cl.
CPC ........ *B60K 17/046* (2013.01); *B60B 27/0015* (2013.01); *B60B 27/0094* (2013.01); *B60K 7/0007* (2013.01); *F16H 57/023* (2013.01); *F16H 57/08* (2013.01); *F16H 2055/176* (2013.01)

(58) Field of Classification Search
CPC ...... F16H 1/32; F16H 2001/327; F16H 57/08; F16H 57/023; F16H 2055/176; F60K 17/046; F60K 7/0007; B60B 27/0012; B60B 27/0094; B60B 27/04
USPC ......... 475/331, 344; 180/372, 344; 74/606 R
See application file for complete search history.

(56) References Cited

U.S. PATENT DOCUMENTS

| | | | | |
|---|---|---|---|---|
| 3,754,625 A | * | 8/1973 | Voth ..................... | B60K 17/046 475/900 |
| 4,838,123 A | * | 6/1989 | Matoba ................. | F16H 57/082 74/411 |
| 11,111,985 B1 | * | 9/2021 | Francis ................. | B60K 17/16 |
| 2010/0035719 A1 | * | 2/2010 | Wang ..................... | F16H 57/08 475/331 |
| 2018/0339549 A1 | * | 11/2018 | Masuda ................ | F16D 65/186 |

\* cited by examiner

*Primary Examiner* — Roger L Pang
(74) *Attorney, Agent, or Firm* — NSIP Law (57) ABSTRACT

An in-wheel drive device includes: a wheel bearing including a hub and an outer race spaced apart outward in a radial direction from the hub; and a speed reducer including a ring gear coupled to the wheel bearing. An outer surface of the ring gear, in the radial direction, and an inner surface of the wheel bearing, in the radial direction, adjoin to define first and second regions. The ring gear includes a protruding portion disposed on the outer surface of the ring gear in the second region and having a shape protruding toward the inner surface of the wheel bearing. The wheel bearing includes a recessed portion disposed on the inner surface of the wheel bearing in the second region and having a shape corresponding to a shape of the protruding portion. The protruding portion and the recessed portion engage each other in the second region.

9 Claims, 6 Drawing Sheets

IN-WHEEL DRIVE DEVICE AND VEHICLE INCLUDING THE SAME

CROSS-REFERENCE TO RELATED APPLICATIONS

This application claims the benefit under 35 U.S.C. § 119(a) of Korean Patent Application No. 10-2020-0093326 filed on Jul. 27, 2020 in the Korean Intellectual Property Office, the entire disclosure of which is incorporated herein by reference for all purposes.

TECHNICAL FIELD

The present disclosure relates to an in-wheel drive device and a vehicle including the same, and more particularly, to an in-wheel drive device having a structure in which a wheel bearing and a speed reducer are coupled, and a vehicle including the in-wheel drive device.

BACKGROUND ART

A motor for converting electrical energy into kinetic energy may be applied to various fields and mounted in various devices. For example, the motor may be mounted in a vehicle and produce power for driving the vehicle. In particular, with the increase in demands for environmentally friendly vehicles for solving problems of environmental pollution emitted from internal combustion engines in the related art, there is also an increasing demand for the motor mounted in the vehicle.

An in-wheel drive device having a structure in which a motor is mounted in a wheel for a vehicle generally has a wheel bearing, a speed reducer, and the like in addition to the motor. In particular, in the in-wheel drive device, the speed reducer is coupled to the wheel bearing. For example, in the in-wheel drive device in the related art, a ring gear of the speed reducer is fixedly coupled to the wheel bearing.

In the related art, examples of the method of coupling the ring gear to the wheel bearing may broadly include a first method that disposes the ring gear on an inner surface of a stationary race of the wheel bearing and performs a heat treatment or a second method that forms concave-convex portions on an inner surface of a stationary race of the wheel bearing and an outer surface of the ring gear and then assembles the inner surface of the wheel bearing and the outer surface of the ring gear.

However, the first method has a problem in that there is a high likelihood that the ring gear and the stationary race of the wheel bearing will be thermally deformed after the heat treatment. The second method has a problem in that due to the concave-convex portions, it is difficult to assemble the ring gear and the wheel bearing, which each have a cylindrical shape, while allowing a central axis of the ring gear and a central axis of the wheel bearing to coincide with each other. These problems degrade the quality of the in-wheel drive device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an in-wheel drive device includes: a wheel bearing including a hub and an outer race spaced apart outward in a radial direction from the hub; and a speed reducer including a ring gear coupled to the wheel bearing. An outer surface of the ring gear, in the radial direction, and an inner surface of the wheel bearing, in the radial direction, adjoin each other to define a first and a second region. The ring gear includes a protruding portion disposed on the outer surface of the ring gear in the second region and having a shape protruding toward the inner surface of the wheel bearing. The wheel bearing includes a recessed portion disposed on the inner surface of the wheel bearing in the second region and having a shape corresponding to a shape of the protruding portion of the ring gear. The protruding portion and the recessed portion engage each other in the second region to define an engagement section.

The outer surface of the ring gear and an inner surface of the hub may adjoin each other to define the first region and the second region, and the recessed portion may be disposed on the inner surface of the hub.

The outer surface of the ring gear and the inner surface of the hub may each have a cross-section with a circular shape, in a section of the in-wheel drive device cut in a direction perpendicular to a width direction in the first region.

The protruding portion may have a shape protruding in the radial direction.

The protruding portion may include a plurality of protruding portions, and the recessed portion may include a plurality of recessed portions. The ring gear may further include connecting portions disposed in the second region and configured to connect the plurality of protruding portions on the outer surface of the ring gear. The connecting portions may each include a flat surface.

The plurality of protruding portions may each include a curved surface.

A width of the ring gear in at least a part of the second region, in the radial direction, may be greater than a width of the ring gear in the first region, in the radial direction.

A width of the ring gear in an entirety of the second region, in the radial direction, may be greater than a width of the ring gear in the first region, in the radial direction.

In another general aspect, an in-wheel drive device includes: a motor; and a speed reducer coupled to one side of the motor. The speed reducer includes: a sun gear coupled to a shaft of the motor; a ring gear disposed outward in a radial direction from the sun gear; and a speed reducer housing configured to accommodate the sun gear and the ring gear. An outer surface of the ring gear, in the radial direction, and an inner surface of the speed reducer housing, in the radial direction, adjoin each other to define a first region and a second region. The ring gear includes a protruding portion disposed on the outer surface of the ring gear in the second region and having a shape protruding toward the inner surface of the speed reducer housing. The speed reducer housing includes a recessed portion disposed on the inner surface of the speed reducer housing in the second region and having a shape corresponding to a shape of the protruding portion of the ring gear. The protruding portion and the recessed portion engage each other in the second region to define an engagement section.

The protruding portion may have a shape protruding in a width direction of the in-wheel drive device.

The protruding portion may include a plurality of protruding portions. The recessed portion may include a plurality of recessed portions. The plurality of protruding portions may be disposed at equal intervals around the ring gear.

The in-wheel drive device may further include a ring gear fixing member facing the ring gear in a width direction of the in-wheel drive device.

The ring gear fixing member may be disposed at another side, among two sides of the ring gear opposing each other in the width direction, that is opposite to one side, among the two sides of the ring gear, at which the protruding portion is disposed.

The ring gear fixing member may be fixed to the inner surface of the speed reducer housing.

A groove having a thickness corresponding to a thickness of the ring gear fixing member may be disposed on the inner surface of the speed reducer housing, and the ring gear fixing member may be fixed to the inner surface of the speed reducer housing by being inserted into the groove.

The outer surface of the ring gear and the inner surface of the speed reducer housing may each have a cross-section with a circular shape, in a section of the in-wheel drive device cut in a direction perpendicular to a width direction in the first region.

The speed reducer housing may further include an accommodation portion disposed at another side, among two sides of the speed reducer housing that oppose each other in a width direction of the in-wheel drive device, that is opposite to one side, among the two sides of the speed reducer housing, at which the ring gear is provided. The accommodation portion may be recessed toward the one side, and the accommodation portion is disposed outward in the radial direction from the ring gear.

The accommodation portion and the ring gear may overlap each other in a view in the radial direction, from outside the in-wheel drive device.

In another general aspect, a vehicle includes an in-wheel drive device. The in-wheel drive device includes: a wheel bearing including a hub and an outer race spaced apart outward in a radial direction from the hub; and a speed reducer including a ring gear coupled to the wheel bearing. An outer surface of the ring gear, in the radial direction, and an inner surface of the wheel bearing, in the radial direction, adjoin each other to define a first region and a second region. The ring gear includes a protruding portion disposed on the outer surface of the ring gear in the second region and having a shape protruding toward the inner surface of the wheel bearing. The wheel bearing includes a recessed portion disposed on the inner surface of the wheel bearing in the second region and having a shape corresponding to a shape of the protruding portion of the ring gear. The protruding portion and the recessed portion engage each other in the second region to define an engagement section.

Other features and aspects will be apparent from the following detailed description, the drawings, and the claims.

DETAILED DESCRIPTION

Hereinafter, an in-wheel drive device and vehicle according to the present disclosure will be described with reference to the drawings.

In-Wheel Drive Device

Figure 1:
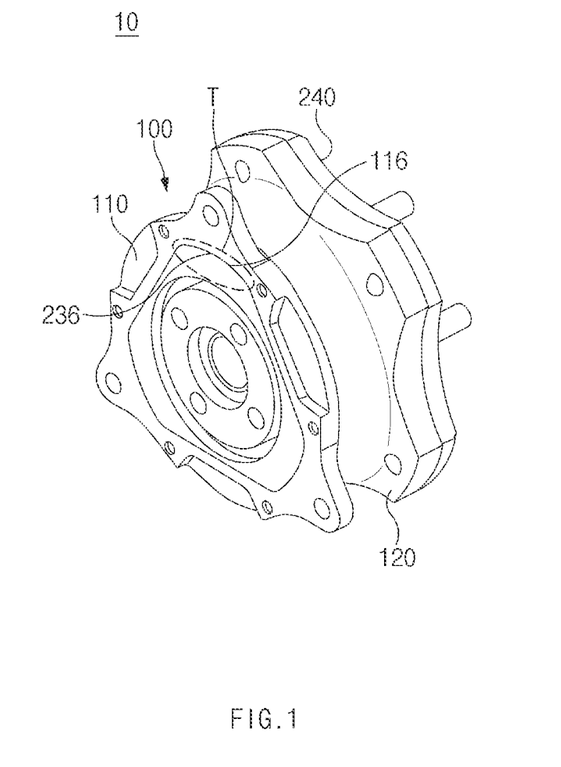
FIG. 1 is a perspective view of an in-wheel drive device according to an embodiment of the present disclosure.
Figure 2:
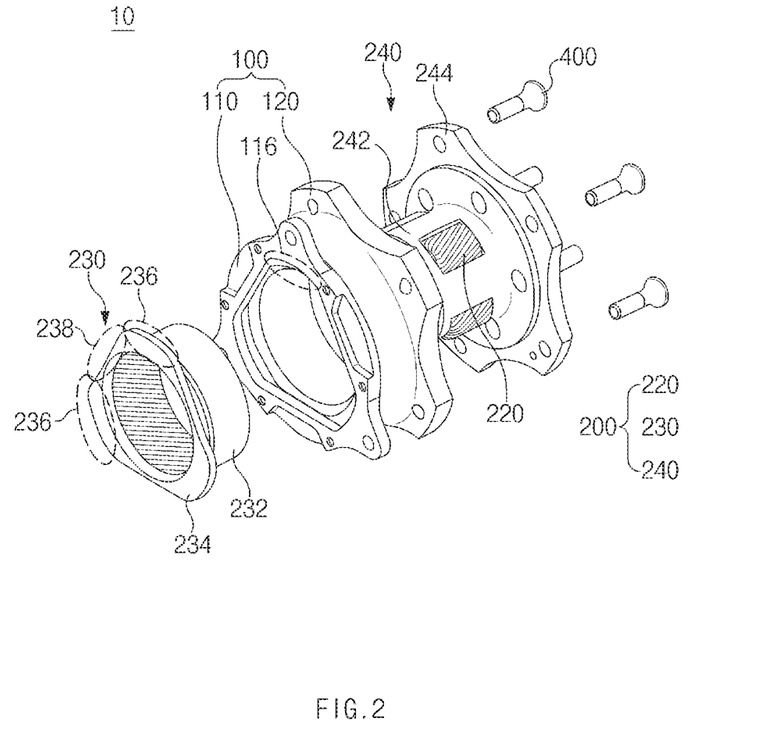
FIG. 2 is an exploded perspective view of the in-wheel drive device according to the embodiment of the present disclosure.

FIG. 1 is a perspective view of an in-wheel drive device according to an embodiment of the present disclosure, and FIG. 2 is an exploded perspective view of the in-wheel drive device according to the embodiment of the present disclosure. Further, FIG. 3 is a radial cross-sectional view of the in-wheel drive device according to the embodiment of the present disclosure.

Figure 3:
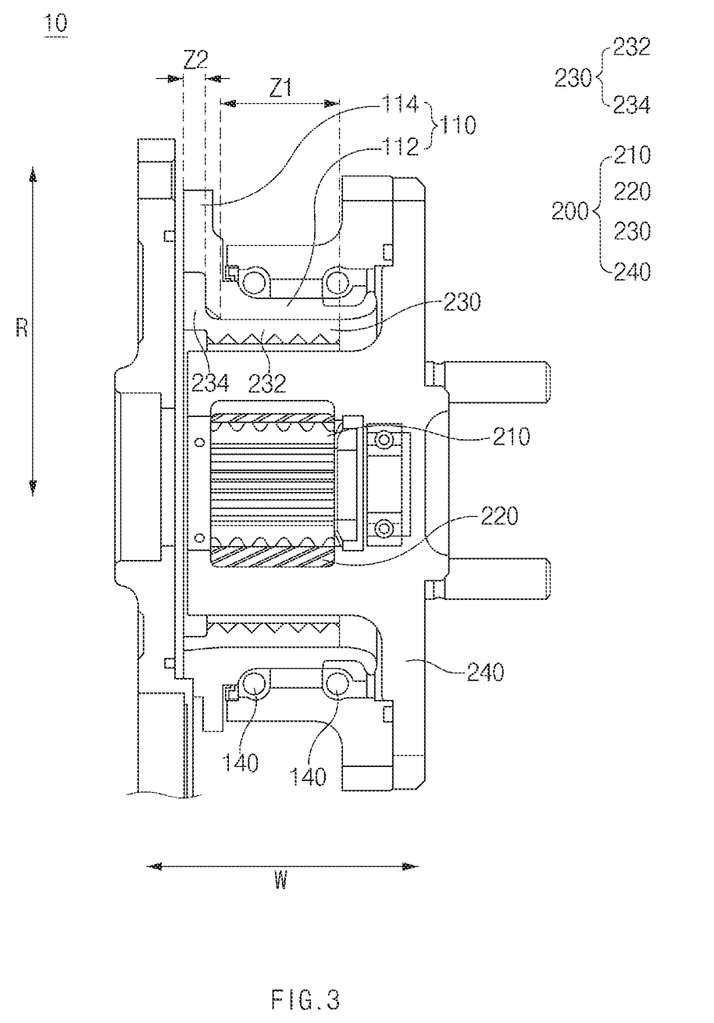
FIG. 3 is a radial cross-sectional view of the in-wheel drive device according to the embodiment of the present disclosure.

As illustrated in FIGS. 1 to 3, an in-wheel drive device 10 according to the present disclosure may include a motor, a wheel bearing 100 provided at one side of the motor, and a speed reducer 200 coupled to the wheel bearing 100. In more detail, at least a part of the speed reducer 200 may be provided in an internal space of the wheel bearing 100. A coupling relationship between the wheel bearing 100 and the speed reducer 200 will be described below.

Meanwhile, the wheel bearing 100 and the speed reducer 200, which constitutes the in-wheel drive device 10 according to the present disclosure, may each include a cylindrical area, as illustrated in FIGS. 1 and 2. In the present specification, a direction from a central axis of the cylindrical area toward an outer side of the cylindrical area will be referred to as a radial direction R of the in-wheel drive device 10, and a direction, which is a thickness direction of the outer side of the cylindrical area and is perpendicular to the radial direction R, will be referred to as a width direction W of the in-wheel drive device 10.

Continuing to refer to FIGS. 1 to 3, the wheel bearing 100 may include a hub 110 and an outer race 120 provided outward in the radial direction R from the hub 110. In this case, the hub 110 may be fixed regardless of a rotation of the motor, and the outer race 120 may rotate when the motor rotates. That is, the hub 110 may be a stationary race, and the outer race 120 may be a rotary race. Alternatively, the hub 110 may be a rotary race, and the outer race 120 may be a stationary race.

In addition, the wheel bearing 100 may include a rolling element 140 provided in an internal space between the hub 110 and the outer race 120. For example, as illustrated in FIG. 3, the rolling element 140 may be provided in plural, and the plurality of rolling elements 140 may be provided in the width direction W.

Meanwhile, as illustrated in FIGS. 1 to 3, the speed reducer 200 of the in-wheel drive device 10 according to the present disclosure may include a sun gear 210 connected to an input shaft, and a plurality of planet gears 220 provided outward from the sun gear 210 and configured to engage with the sun gear 210. The plurality of planet gears 220 may be provided at an equal interval and disposed around the sun gear 210.

In addition, the speed reducer 200 may further include: a ring gear 230 provided to surround outer surfaces in the radial direction R of the plurality of planet gears 220 and configured to engage with the plurality of planet gears 220; and a carrier 240 coupled to the planet gears 220 and configured to transmit, to the outside, power generated by the revolution of the plurality of planet gears 220 around the sun gear (i.e., the movement of the plurality of planet gears 220 along an outer surface of the sun gear 210). That is, according to the present disclosure, the carrier 240 may rotate about its center by the revolution of the planet gears 220 around the sun gear, and the rotation of the carrier 240 may be transmitted to a wheel (not illustrated).

Meanwhile, as illustrated in FIGS. 1 to 3, the carrier 240 may be configured to accommodate the plurality of planet gears 220. The carrier 240 may have through-holes through which the planet gears 220 are exposed to the outside so that the plurality of planet gears 220 may engage with the sun gear 210. In more detail, the carrier 240 may include: a carrier body 242 configured to accommodate the plurality of planet gears 220 and having the through-holes through which the plurality of planet gears 220 is exposed to the outside, and a carrier head 244 provided at one side of the carrier body 242 and having a larger width in the radial direction R than the carrier body 242.

In addition, according to the present disclosure, in the in-wheel drive device 10, the carrier 240 and the wheel bearing 100 may face each other in the width direction W. For example, as illustrated in FIGS. 1 to 3, the carrier head 244 may face the outer race 120 of the wheel bearing 100 in the state in which the in-wheel drive device 10 is assembled. More particularly, the carrier 240 and the outer race 120 may be coupled to each other by outer race-carrier fixing members 400 that penetrate the carrier head 244 and the outer race 120. Therefore, the motion of the carrier 240 and the motion of the outer race 120 may be synchronized.

According to the embodiment of the present disclosure, an outer surface in the radial direction R of the ring gear 230 and an inner surface in the radial direction R of the wheel bearing 100 may adjoin each other. In more detail, the outer surface of the ring gear 230 and an inner surface of the hub 110 may adjoin each other. More particularly, the outer surface of the ring gear 230 and the inner surface of the hub 110 may be in close contact with each other and fixed to each other. Therefore, when the hub 110 is a stationary race as described above, the ring gear 230 may also be fixed regardless of whether the motor operates.

Meanwhile, according to the present disclosure, a region in which the outer surface of the ring gear 230 and the inner surface of the hub 110 adjoin each other in the radial direction R may be divided into a first region Z1 and a second region Z2.

That is, as illustrated in FIG. 3, the hub 110 may include: a hub body 112 configured to define a body of the hub 110; and a hub head 114 provided at one side of the hub body 112 and having a larger width in the radial direction R than the hub body 112. Similarly, the ring gear 230 may include: a ring gear body 232 configured to define a body of the ring gear 230; and a ring gear head 234 provided at one side of the ring gear body 232 and having a larger width in the radial direction R than the ring gear body 232.

In this case, as illustrated in FIG. 3, an inner surface of the hub body 112 may face an outer surface of the ring gear body 232, and an inner surface of the hub head 114 may face an outer surface of the ring gear head 234. Further, the first region Z1 may be a region in which the hub body 112 and the ring gear body 232 adjoin each other, and the second region Z2 may be a region in which the hub head 114 and the ring gear head 234 adjoin each other.

Meanwhile, according to the embodiment of the present disclosure, when the in-wheel drive device 10 is cut in a direction perpendicular to the width direction W in the first region Z1, the outer surface of the ring gear 230 and the inner surface of the hub 110 may each have a cross-section with a circular shape. That is, the outer surface of the ring gear body 232 and the inner surface of the hub body 112 may each have a cross-section with a circular shape. Therefore, according to the embodiment of the present disclosure, as a cylindrical shape of the ring gear body 232 and a cylindrical shape of the hub body 112 are coupled to each other, a central axis of the ring gear 230 and a central axis of the hub 110 may easily coincide with each other, which makes it possible to improve the quality of the in-wheel drive device 10.

Meanwhile, according to the present disclosure, since the outer surface of the ring gear body 232 and the inner surface of the hub body 112 may each have a cross-section with a circular shape without a concave-convex structure, the ring gear 230 and the hub 110 may slip with respect to the central axis of the in-wheel drive device 10 when the ring gear 230 has only the ring gear body 232 and the hub 110 has only the hub body 112. In order to prevent the problem with the slippage, an additional configuration for implementing a restriction relationship between the hub 110 and the ring gear 230 needs to be provided.

To this end, referring to FIGS. 1 to 3, according to the present disclosure, the ring gear 230 may include a protruding portion 236 having a shape protruding toward the inner surface of the wheel bearing 100. In more detail, the ring gear 230 may include the protruding portion 236 provided on the outer surface of the ring gear 230 in the second region Z2 and having a shape protruding toward the inner surface of the hub 110. That is, the protruding portion 236 may be provided on the ring gear head 234.

Meanwhile, the wheel bearing 100 may have a recessed portion having a shape corresponding to a shape of the protruding portion 236. In more detail, the hub 110 may include the recessed portion 116 provided on the inner surface of the hub 110 in the second region Z2 and having a shape corresponding to a shape of the protruding portion 236 of the ring gear 230. That is, the recessed portion 116 may be provided on the hub head 114.

In this case, since the protruding portion 236 and the recessed portion 116 may have the shapes corresponding to each other, the protruding portion 236 and the recessed portion 116 may engage with each other, such that an engagement section T may be defined. According to the present disclosure, since the engagement section T is provided, a restriction relationship may be implemented between the ring gear 230 and the hub 110 with respect to the rotational motion about the central axis of the in-wheel drive device 10. Therefore, it is possible to prevent the slippage between the ring gear 230 and the hub 110 even though the ring gear body 232 and the hub body 112 each have a cross-section with a circular shape. In particular, according to the present disclosure, it is possible to implement the restriction relationship between the ring gear 230 and the hub 110 using the structural characteristics of the ring gear 230 and the hub 110 without performing a separate bonding process using a heat treatment to implement the restriction relationship between the ring gear 230 and the hub 110. Further, it is possible to easily allow the central axis of the ring gear 230 and the central axis of the hub 110 to coincide with each other.

Meanwhile, as illustrated in FIGS. 1 to 2, the protruding portion 236 may have a shape protruding in the radial direction R, and the recessed portion 116 may have a shape recessed in the radial direction R. In addition, the protruding portion 236 may be provided in plural, and the recessed portion 116 may be provided in plural. FIGS. 1 to 2 illustrate an example in which three protruding portions 236 and three recessed portions 116 are provided. In this case, the plurality of protruding portions 236 may each have a curved surface. For example, as illustrated in FIGS. 1 and 2, the plurality of protruding portions 236 may each have a curved surface. In addition, the plurality of recessed portions 116 may also each have a curved surface having a shape corresponding to a shape of the curved surface of the protruding portion 236.

In addition, the ring gear 230 may further include a plurality of connecting portions 238 provided in the second region Z2, i.e., disposed on the ring gear head 234 and configured to connect the plurality of protruding portions 236 provided on the outer surface of the ring gear head 234. FIGS. 1 and 2 illustrate three connecting portions 238 provided on the ring gear 230. In this case, the plurality of connecting portions 238 may each have a flat surface. For example, as illustrated in FIGS. 1 and 2, the plurality of connecting portions 238 may each have a flat surface.

Meanwhile, as described above, the ring gear head 234 may have a larger width than the ring gear body 232. In more detail, a width in the radial direction R of the ring gear 230, i.e., a width of the ring gear head 234 in at least a part of the second region Z2 may be larger than a width in the radial direction R of the ring gear 230, i.e., a width of the ring gear body 232 in the first region Z1. More particularly, the width in the radial direction R of the ring gear head 234 in the entire second region Z2 may be larger than the width of the ring gear body 232 in the first region Z1. Alternatively, according to another example of the present disclosure, a width in the radial direction R of the ring gear head 234 in a part of the second region Z2 may be equal to or smaller than the width of the ring gear body 232 in the first region Z1.

Figure 4:
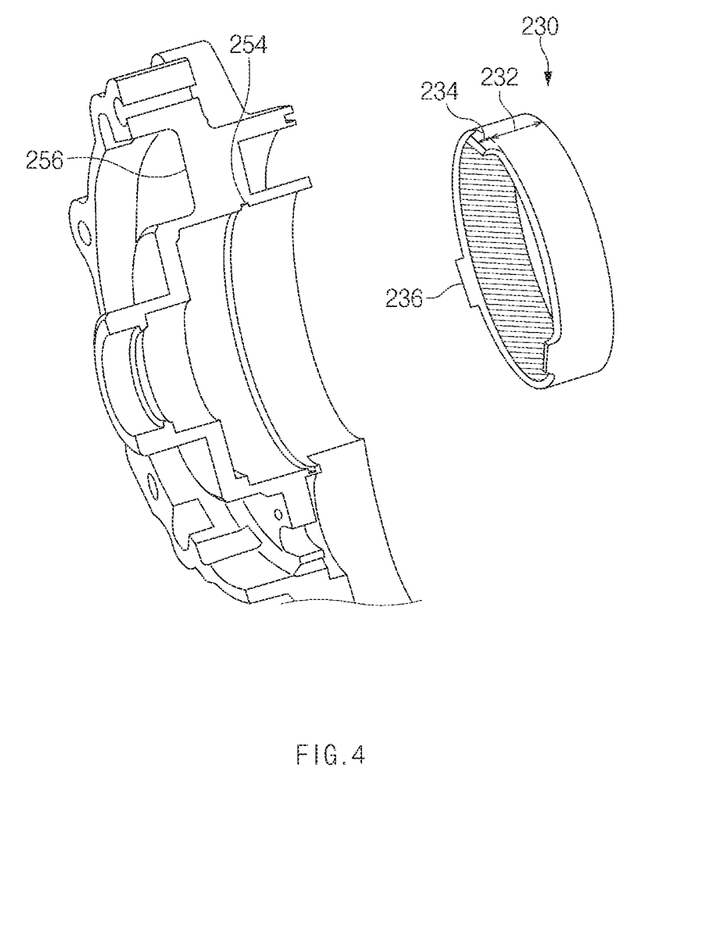
FIG. 4 is a perspective view illustrating a speed reducer housing and a ring gear of an in-wheel drive device according to another embodiment of the present disclosure.
Figure 5:
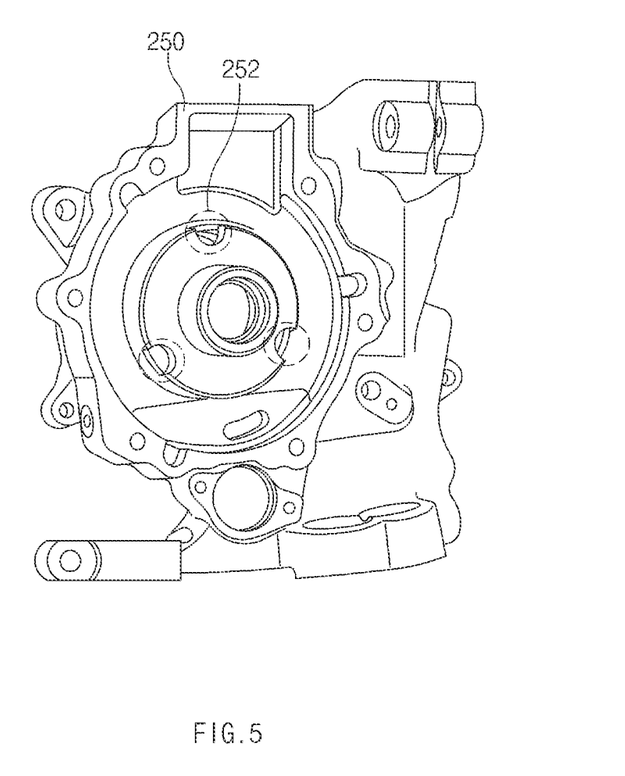
FIG. 5 is a perspective view illustrating an entire structure of the speed reducer housing of the in-wheel drive device according to another embodiment of the present disclosure.
Figure 6:
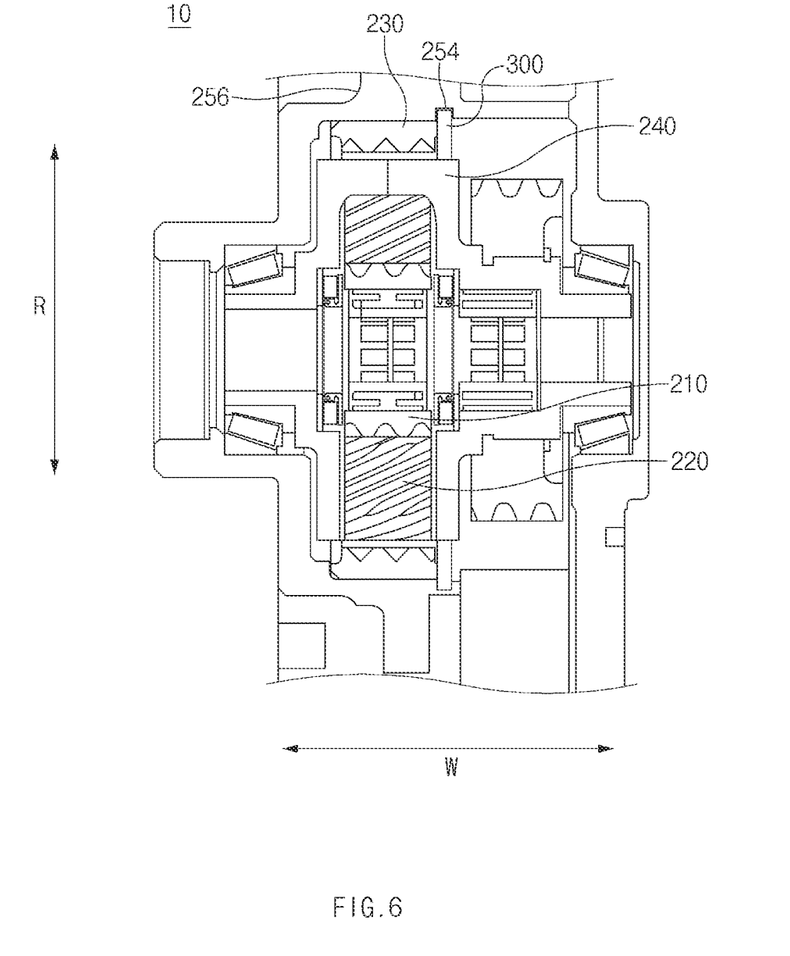
FIG. 6 is a radial cross-sectional view of the in-wheel drive device according to another embodiment of the present disclosure.

FIG. 4 is a perspective view illustrating a speed reducer housing and a ring gear of an in-wheel drive device according to another embodiment of the present disclosure, and FIG. 5 is a perspective view illustrating an entire structure of the speed reducer housing of the in-wheel drive device according to another embodiment of the present disclosure. Further, FIG. 6 is a radial cross-sectional view of the in-wheel drive device according to another embodiment of the present disclosure. Hereinafter, the in-wheel drive device according to another embodiment of the present disclosure will be described, focusing on differences from the in-wheel drive device according to the foregoing embodiment of the present disclosure, and the contents mentioned in the foregoing embodiment of the present disclosure may be applied as it is to the in-wheel drive device according to another embodiment of the present disclosure unless the contents are contradictory to the in-wheel drive device according to another embodiment of the present disclosure.

According to another embodiment of the present disclosure, unlike the foregoing embodiment of the present disclosure, the speed reducer 200 provided in the in-wheel drive device 10 may not only include the sun gear 210 coupled to the shaft of the motor, the planet gears 220, the carrier 240, and the ring gear 230 provided outward in the radial direction R from the sun gear 210, but also include a speed reducer housing 250 configured to accommodate the sun gear 210, the planet gears 220, the ring gear 230, and the carrier 240.

In this case, according to another embodiment of the present disclosure, the outer surface in the radial direction R of the ring gear 230 and the inner surface in the radial direction R of the speed reducer housing 250 may adjoin each other, thereby providing a first region and a second region. Although not clearly illustrated in FIGS. 4 to 6, the first and second regions according to another embodiment of the present disclosure may correspond to the first and second regions Z1 and Z2 (see FIGS. 1 to 3) according to the foregoing embodiment of the present disclosure.

Similar to the foregoing embodiment of the present disclosure, the ring gear 230 according to another embodiment of the present disclosure may include the ring gear body 232 and the ring gear head 234 provided at one side of the ring gear body 232. The ring gear body 232 may be provided in the first region, and the ring gear head 234 may be provided in the second region.

In addition, the ring gear 230 may include the protruding portion 236 provided on the outer surface of the ring gear head 234 in the second region and having a shape protruding toward an inner surface of the speed reducer housing 250. Further, the speed reducer housing 250 may include a recessed portion 252 provided on the inner surface of the speed reducer housing 250 in the second region and having a shape corresponding to a shape of the protruding portion 236 of the ring gear 230. In this case, the protruding portion 236 and the recessed portion 252 may adjoin each other, thereby providing an engagement section. Therefore, according to another embodiment of the present disclosure, the engagement section may be provided in the second region. According to another embodiment of the present disclosure, since the engagement section is provided, a restriction relationship may be implemented between the ring gear 230 and the speed reducer housing 250 with respect to the rotation about the central axis of the in-wheel drive device 10. Therefore, according to another embodiment of the present disclosure, it is possible to prevent the slippage between the ring gear 230 and the speed reducer housing 250.

Meanwhile, according to another embodiment of the present disclosure, when the in-wheel drive device 10 is cut in the direction perpendicular to the width direction W in the first region, i.e., the region provided when the outer surface of the ring gear body 232 and the inner surface of the speed reducer housing 250 adjoin each other, the outer surface of the ring gear body 232 of the ring gear 230 and the inner surface of the speed reducer housing 250 may each have a cross-section with a circular shape. Therefore, according to another embodiment of the present disclosure, as a cylindrical shape of the ring gear body 232 and a cylindrical shape of the speed reducer housing 250 are coupled to each other, the central axis of the ring gear 230 and the central axis of the speed reducer housing 250 may easily coincide with each other, which makes it possible to improve the quality of the in-wheel drive device 10.

Meanwhile, unlike the foregoing embodiment of the present disclosure, according to another embodiment of the present disclosure, as illustrated in FIG. 4, the protruding portion 236 may have a shape protruding in the width direction W of the in-wheel drive device 10, and the recessed portion 252 may have a shape recessed in the width direction W of the in-wheel drive device 10.

In addition, the protruding portion 236 may be provided in plural, and the recessed portion 252 may be provided in plural. FIGS. 4 and 5 illustrate three protruding portions 236 and three recessed portions 252. Further, the plurality of protruding portions 236 may be provided at an equal interval around the ring gear 230, and the recessed portions 252 may also be provided at an equal interval around the speed reducer housing 250.

Continuing to refer to FIG. 4, the speed reducer housing 250 according to another embodiment of the present disclosure may further include an accommodation portion 256 provided at the other side of the two opposite sides in the width direction W of the speed reducer housing 250 which is opposite to one side at which the ring gear 230 is provided. The accommodation portion 256 having a shape recessed toward one side. A part of the motor may be accommodated in the accommodation portion 256. For example, a part of a stator of the motor may be accommodated in the accommodation portion 256. In this case, the accommodation portion 256 may be provided outward in the radial direction R from the ring gear 230.

According to another embodiment of the present disclosure, the ring gear 230 may be coupled to one side of the speed reducer housing 250, and a part of the motor may be coupled to the other side of the speed reducer housing 250 through the accommodation portion 256. In this case, since the accommodation portion 256 may be provided outward in the radial direction R from the ring gear 230, the interference may occur between the ring gear 230 and the accommodation portion 256 when the protruding portion 236 has a shape protruding in the radial direction R, as in the foregoing the embodiment of the present disclosure. In order to prevent the interference, the protruding portion 236 according to another embodiment of the present disclosure may have a shape protruding in the width direction W when the ring gear 230 is coupled to the inner surface of the speed reducer housing 250.

In particular, as illustrated in FIGS. 4 and 6, according to another embodiment of the present disclosure, the accommodation portion 256 and the ring gear 230 may partially overlap each other when the in-wheel drive device 10 is viewed from the outside in the radial direction R. In this case, when the protruding portion 236 provided on the ring gear 230 protrudes in the width direction W, the interference between the ring gear 230 and the accommodation portion 256 may be prevented, and the space of the speed reducer housing 250 may be more efficiently utilized.

Continuing to refer to FIG. 6, the in-wheel drive device 10 according to another embodiment of the present disclosure may further include a ring gear fixing member 300 provided to face the ring gear 230 in the width direction W of the in-wheel drive device 10. The ring gear fixing member 300 may be configured to prevent the ring gear 230 from moving in the width direction W. In particular, since the ring gear 230 is coupled to the speed reducer housing 250 as described above, the motion of the ring gear 230 may be restricted in the direction in which the ring gear 230 faces the speed reducer housing 250. However, the motion of the ring gear 230 may not be restricted in the direction (the rightward direction based on FIG. 6) opposite to the direction in which the ring gear 230 faces the speed reducer housing 250. The ring gear fixing member 300 may be configured to prevent the ring gear 230 from moving in the direction opposite to the direction in which the ring gear 230 faces the speed reducer housing 250. Therefore, the ring gear fixing member 300 may be provided at the other side of the two opposite sides in the width direction W of the ring gear 230 which is opposite to one side at which the protruding portion 236 is provided.

Meanwhile, the ring gear fixing member 300 also needs to be fixed such that the ring gear fixing member 300 restricts the motion of the ring gear 230. For example, as illustrated in FIG. 6, the ring gear fixing member 300 may be fixed to the inner surface of the speed reducer housing 250. In more detail, a groove 254 having a thickness corresponding to a thickness of the ring gear fixing member 300 may be provided in the inner surface of the speed reducer housing 250, and the ring gear fixing member 300 may be fixed to the inner surface of the speed reducer housing 250 by being inserted into the groove 254.

Vehicle

A vehicle according to the present disclosure may include the in-wheel drive device 10. The in-wheel drive device 10 may be configured to provide rotational power to a wheel provided in a vehicle to move the vehicle.

Meanwhile, referring to FIGS. 1 to 3, the in-wheel drive device 10 may include: the wheel bearing 100 including the hub 110, and the outer race 120 spaced apart outward in the radial direction R from the hub 110; and the speed reducer 200 including the ring gear 230 coupled to the wheel bearing 100. Meanwhile, the speed reducer 200 may further include the sun gear 210, the planet gears 220, and the carrier 240. The detailed description of the configuration of the speed reducer 200 may be replaced with the above-mentioned description.

According to the present disclosure, the outer surface, in the radial direction R of the in-wheel drive device 10, of the ring gear 230 and the inner surface in the radial direction R of the wheel bearing 100 may adjoin each other, thereby providing the first region Z1 and the second region Z2. In more detail, the first region Z1 and the second region Z2 may be defined as the outer surface of the ring gear 230 and the inner surface of the hub 110 adjoin each other.

In addition, the ring gear 230 may include the protruding portion 236 provided on the outer surface of the ring gear 230 in the second region Z2 and having a shape protruding toward the inner surface of the wheel bearing 100. Further, the wheel bearing 100 may include the recessed portion 116 provided on the inner surface of the wheel bearing 100 in the second region Z2 and having a shape corresponding to a shape of the protruding portion 236 of the ring gear 230. In more detail, the recessed portion 116 may be provided on the inner surface of the hub 110. In this case, according to the present disclosure, the protruding portion 236 and the recessed portion 116 may engage with each other in the second region Z2, such that the engagement section T may be defined.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

DESCRIPTION OF REFERENCE NUMERALS

10: In-wheel drive device
100: Wheel bearing
110: Hub
112: Hub body
114: Hub head
116: Recessed portion
120: Outer race
140: Rolling element
200: Speed reducer
210: Sun gear
220: Planet gear
230: Ring gear
232: Ring gear body
234: Ring gear head
236: Protruding portion
238: Connecting portion
240: Carrier 242: Carrier body
244: Carrier head
250: Speed reducer housing
252: Recessed portion
254: Groove
256: Accommodation portion
300: Ring gear fixing member
400: Outer race-carrier fixing member
R: Radial direction
W: Width direction
Z1: First region
Z2: Second region
T: Engagement section

What is claimed is:

1. An in-wheel drive device, comprising:
a wheel bearing comprising a hub and an outer race spaced apart outward in a radial direction from the hub; and
a speed reducer comprising a ring gear coupled to the wheel bearing,
wherein an outer surface of the ring gear, in the radial direction, and an inner surface of the wheel bearing, in the radial direction, adjoin each other to define a first region and a second region,
wherein the ring gear comprises a protruding portion disposed on the outer surface of the ring gear in the second region and having a shape protruding toward the inner surface of the wheel bearing,
wherein the wheel bearing comprises a recessed portion disposed on the inner surface of the wheel bearing in the second region and having a shape corresponding to a shape of the protruding portion of the ring gear, and
wherein the protruding portion and the recessed portion engage each other in the second region to define an engagement section.

2. The in-wheel drive device of claim 1, wherein the outer surface of the ring gear and an inner surface of the hub adjoin each other to define the first region and the second region, and the recessed portion is disposed on the inner surface of the hub.

3. The in-wheel drive device of claim 2, wherein the outer surface of the ring gear and the inner surface of the hub each have a cross-section with a circular shape, in a section of the in-wheel drive device cut in a direction perpendicular to a width direction in the first region.

4. The in-wheel drive device of claim 1, wherein the protruding portion has a shape protruding in the radial direction.

5. The in-wheel drive device of claim 4, wherein the protruding portion includes a plurality of protruding portions, and the recessed portion includes a plurality of recessed portions,
wherein the ring gear further comprises connecting portions disposed in the second region and configured to connect the plurality of protruding portions on the outer surface of the ring gear, and
wherein the connecting portions each comprise a flat surface.

6. The in-wheel drive device of claim 5, wherein the plurality of protruding portions each comprise a curved surface.

7. The in-wheel drive device of claim 4, wherein a width of the ring gear in at least a part of the second region, in the radial direction, is greater than a width of the ring gear in the first region, in the radial direction.

8. The in-wheel drive device of claim 4, wherein a width of the ring gear in an entirety of the second region, in the radial direction, is greater than a width of the ring gear in the first region, in the radial direction.

9. A vehicle, comprising:
an in-wheel drive device,
wherein the in-wheel drive device comprises:
a wheel bearing comprising a hub and an outer race spaced apart outward in a radial direction from the hub; and
a speed reducer comprising a ring gear coupled to the wheel bearing,
wherein an outer surface of the ring gear, in the radial direction, and an inner surface of the wheel bearing, in the radial direction, adjoin each other to define a first region and a second region,
wherein the ring gear comprises a protruding portion disposed on the outer surface of the ring gear in the second region and having a shape protruding toward the inner surface of the wheel bearing,
wherein the wheel bearing comprises a recessed portion disposed on the inner surface of the wheel bearing in the second region and having a shape corresponding to a shape of the protruding portion of the ring gear, and
wherein the protruding portion and the recessed portion engage each other in the second region to define an engagement section.

* * * * *